(12) United States Patent
Hong

(10) Patent No.: US 8,817,113 B2
(45) Date of Patent: Aug. 26, 2014

(54) IMAGE DISTRIBUTION SYSTEM AND METHODS

(75) Inventor: Seungwook Hong, San Diego, CA (US)

(73) Assignee: Sony Corporation, Tokyo (JP)

( * ) Notice: Subject to any disclaimer, the term of this patent is extended or adjusted under 35 U.S.C. 154(b) by 98 days.

(21) Appl. No.: 13/545,867

(22) Filed: Jul. 10, 2012

(65) Prior Publication Data

US 2014/0015985 A1  Jan. 16, 2014

(51) Int. Cl.
*H04N 5/225* (2006.01)
*H04N 5/232* (2006.01)

(52) U.S. Cl.
USPC ........... 348/207.1; 348/207.2; 348/211.99; 348/211.1; 348/211.2; 348/211.3

(58) Field of Classification Search
None
See application file for complete search history.

(56) References Cited

U.S. PATENT DOCUMENTS

| | | | | |
|---|---|---|---|---|
| 2004/0099741 | A1* | 5/2004 | Dorai et al. | 235/462.08 |
| 2006/0055804 | A1* | 3/2006 | Arai et al. | 348/333.01 |
| 2007/0176000 | A1* | 8/2007 | Cattrone et al. | 235/462.01 |
| 2008/0018746 | A1 | 1/2008 | Kawanami | |
| 2009/0212113 | A1* | 8/2009 | Chiu et al. | 235/462.41 |
| 2011/0050926 | A1* | 3/2011 | Asano | 348/211.2 |
| 2011/0079639 | A1* | 4/2011 | Khan | 235/375 |
| 2011/0139874 | A1* | 6/2011 | Fu et al. | 235/462.01 |
| 2013/0135483 | A1* | 5/2013 | Tokunaga | 348/207.1 |
| 2013/0286231 | A1* | 10/2013 | Toda | 348/207.2 |

OTHER PUBLICATIONS

Liu, Xu et al., "A new Approach for Codec—A Camera-based Mobile Data Channel: Capacity and Analysis," MM'08, Oct. 26-31, 2008, Vancouver, British Columbia, Canada (10 pages).
Yuanyuan, Liu, "LCD Sub-pixel Encoding and Decoding Based on Machine Vision," Master Thesis, Royal Institute of Technology (KTH), Jun. 2010 (60 pages).

* cited by examiner

*Primary Examiner* — Lin Ye
*Assistant Examiner* — John H Morehead, III
(74) *Attorney, Agent, or Firm* — Fitch, Even, Tabin & Flannery, LLP

(57) ABSTRACT

A method of distributing digital images includes capturing a first digital image using the first digital camera and converting, using the first digital camera, the first digital image into lossless code. The lossless code is displayed on the display of the first digital camera and is captured using a second digital camera. The lossless code captured from the display of the first digital camera is converted, using the second digital camera, into a copy of the first digital image, and the copy of the first digital image converted from the lossless code is displayed on the display screen of the second digital camera.

23 Claims, 4 Drawing Sheets

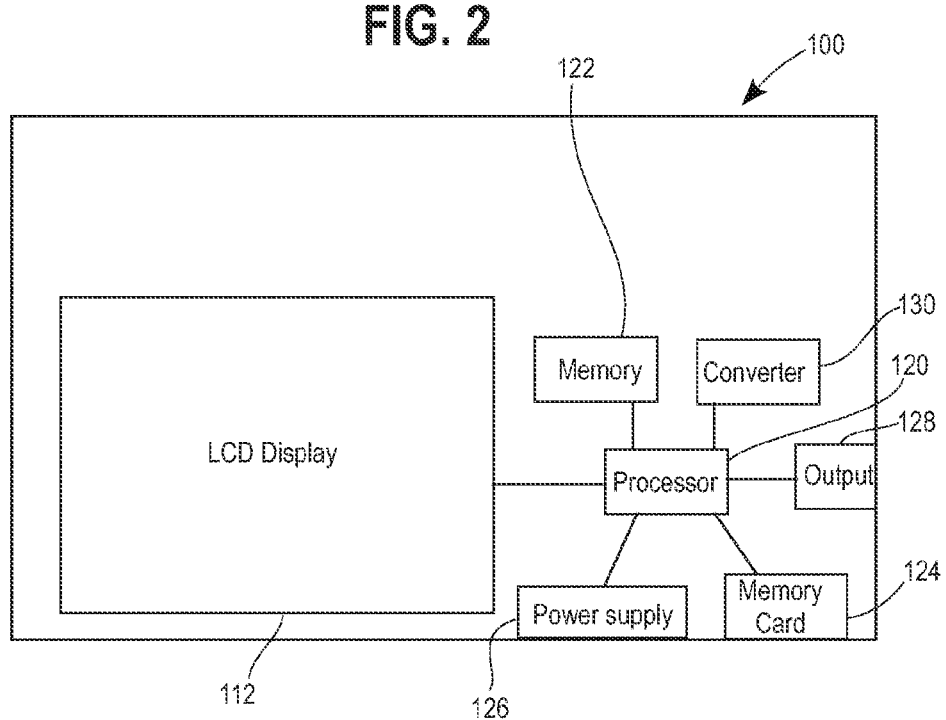

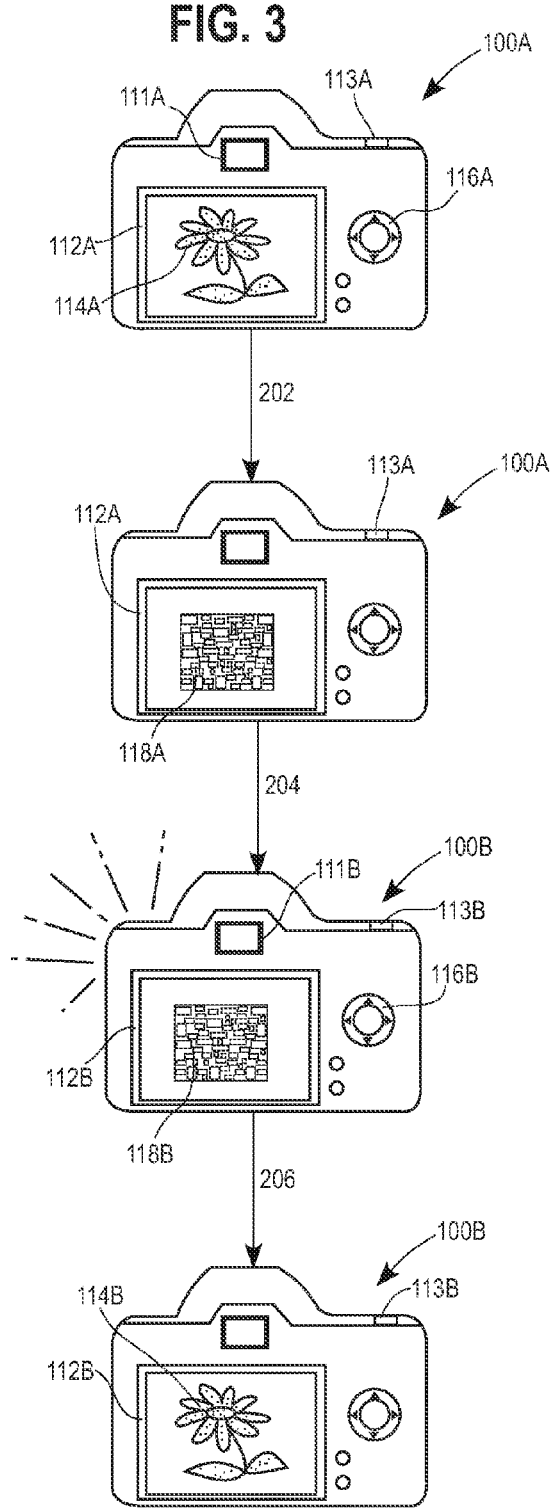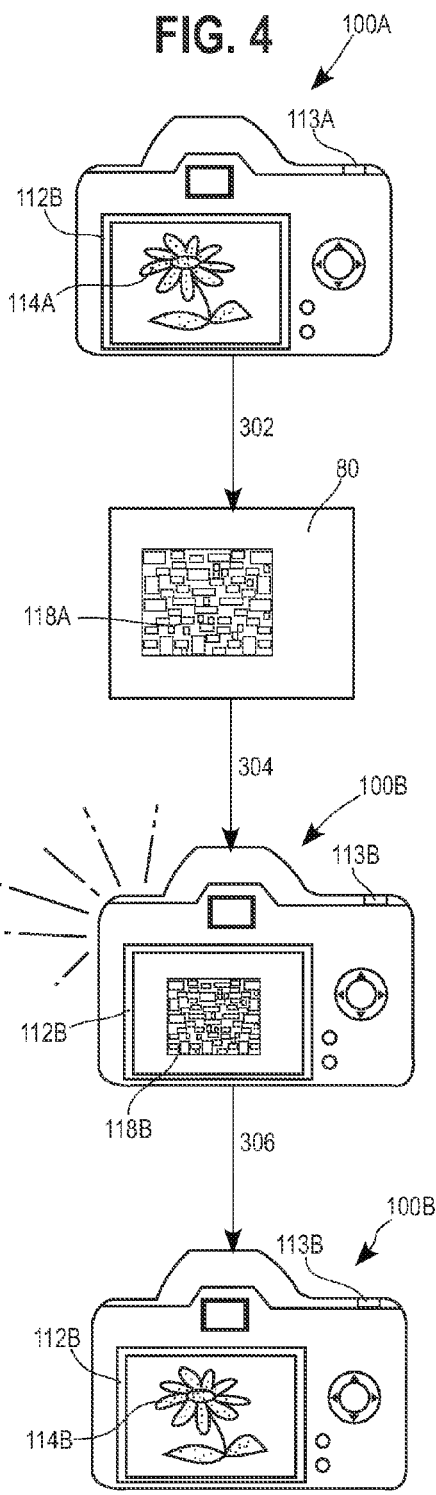

IMAGE DISTRIBUTION SYSTEM AND METHODS

FIELD

This invention relates to distributing digital pictures, and in particular, to distributing digital images via lossless code.

BACKGROUND

Digital cameras are used to capture digital images such as photographs. The digital cameras typically store the digital images as high quality image data such as RAW data, or as compressed data such as JPEG. Most commercially available digital cameras include non-volatile data storage in the form of memory cards, for example, SD, SDHC, or the like storage media that can store the RAW, JPEG, and other data representative of the digital images captured by a user.

Digital camera users often share their digital photographs with others. Some users connect their digital camera to a personal computing device such as a desktop or a laptop computer, transfer the digital images desired to be shared onto the computer's hard drive, and then burn the digital images onto portable digital storage media such as CD-ROMs or DVD-ROMs. Other users upload their digital images onto the World Wide Web and allow others to download the uploaded digital images from the website. Many users also distribute their digital images to others by attaching one or more digital images to an e-mail message and sending the attached digital images via e-mail servers to intended recipients.

The above-described digital image distribution methods typically require compression of the original digital image and result in a reduction in image quality. In addition, such methods not only require the use of devices e.g., a laptop) in addition to the digital camera and memory card, but also the use of communication networks such as the Internet and the World Wide Web. Moreover, the above-described methods do not provide users with the ability to spontaneously share memorable or especially appealing digital photographs with other people contemporaneously present at various events such as parties, family gatherings, sporting events, or the like without relying on a an additional computing device and Internet access.

Accordingly, what is needed is a method of distribution of digital images that overcomes the shortcomings of the aforementioned methods.

SUMMARY

The present invention satisfies this need. In one embodiment, a method of distributing digital images comprises: providing first and second digital cameras each including a display and adapted to capture digital images; capturing a first digital image using the first digital camera; converting, using the first digital camera, the first digital image into lossless code; displaying the lossless code on the display of the first digital camera; capturing, using a second digital camera, the lossless code displayed on the display of the first digital camera; converting, using the second digital camera, the lossless code captured from the display of the first digital camera into a copy of the first digital image; and displaying, on the display of the second digital camera, the copy of the first digital image converted from the lossless code.

Converting the first digital image into lossless code can include converting a data file representing the first digital image into at least one lossless code image, and storing data representing the at least one lossless code image in at least one of a volatile memory and a non-volatile memory of the first digital camera.

Displaying the lossless code on the display of the first digital camera can include displaying a plurality of lossless code images on the display of the first digital camera, each of the plurality of lossless code images being representative of a respective part of a data file comprising the first digital image.

In one approach, the capturing the lossless code displayed on the display of the first digital camera can include capturing, using the second camera, each of the plurality of the lossless code images representative of the respective part of the data file comprising the first digital image. In another approach, the capturing the lossless code displayed on the display of the first digital camera can include storing data representing the lossless code captured by the second digital camera in at least one of volatile and non-volatile memory of the second digital camera.

Converting the lossless code captured from the display of the first digital camera into a copy of the first digital image can include converting data representing at least one lossless code image corresponding to the first digital image into a data file comprising a copy of the first digital image.

In another preferred embodiment, a method of distributing digital images comprises: providing first and second digital cameras each including a display and adapted to capture digital images; capturing a first digital image using the first digital camera; converting, using the first digital camera, the first digital image into lossless code; printing the lossless code on at least one sheet of paper; capturing the lossless code on the at least one sheet of paper using a second digital camera; converting, using the second digital camera, the lossless code captured from the at least one sheet of paper into a copy of the first digital image; and displaying, on the display of the second digital camera, the copy of the first digital image converted from the lossless code printed on the at least one sheet of paper.

Converting the first digital image into lossless code can include converting a data file representing the first digital image into at least one lossless code image and storing data representing the at least one lossless code image in at least one of a volatile memory and a non-volatile memory of the first digital camera.

Printing the lossless code on at least one sheet of paper can include printing a plurality of lossless code images on the at least one sheet of paper. Each of the plurality of lossless code images can be representative of a respective part of a data file comprising the first digital image.

In one approach, the capturing the lossless code on the at least one sheet of paper includes capturing, using the second camera, each of the plurality of the lossless code images representative of the respective part of the data file comprising the first digital image. In another approach, the capturing the lossless code displayed on the display of the first digital camera can include storing data representing the lossless code in at least one of volatile and non-volatile memory of the second digital camera.

Converting the lossless code on the at least one paper into the copy of the first digital image can include converting data representing the lossless code representative of the first digital image into a data file comprising the copy of the first digital image.

In another embodiment, a method of distributing digital images comprises: providing a first digital camera including a display and adapted to capture digital images; capturing a first digital image using the first digital camera; converting, using the first digital camera, the first digital image into lossless code; storing the lossless code on a digital storage medium; converting the lossless code stored on the digital storage medium into a copy of the first digital image using a computing device including a processor and a display; and displaying, on the display of a computing device, the copy of the first digital image converted from the lossless code stored on the digital storage medium.

Storing the lossless code on the digital storage medium can further comprise storing the lossless code on one of a portable memory drive and a hard drive of the computing device.

Converting the lossless code stored on the digital storage medium into a copy of the first digital image can include displaying the lossless code stored on the digital storage medium on the display of the computing device.

Displaying the lossless code on the display of the computing device can further include capturing the lossless code displayed on the display of the computing device using a second digital camera. The method can further include converting, using the second digital camera, the lossless code captured from the display of the computing device to the copy of the first digital image. The method can further include printing, on at least one sheet of paper, the lossless code displayed on the display of the computing device.

In one approach, the method further includes capturing the lossless code displayed on the at least one sheet of paper using one of a second digital camera and a second computing device. The method can further include converting, using a respective one of the second digital camera and the second computing device, the lossless code captured from the sheet of paper into the copy of the first digital image.

The digital image distribution system and methods described in the present application provide numerous advantages over the presently used systems and methods. One advantage is that a digital image desired to be distributed to others is converted to lossless code and later reproduced as an identical image without any loss in image quality. Another advantage is that the methods of distribution of digital images described herein do not require communication networks such as the Internet or the World Wide Web. Yet another advantage is that a digital image can be transferred from a digital camera to another digital camera without having to use a computer or additional storage media such as hard drives or data storage cards. Further advantages will be appreciated by those of ordinary skill in the art with reference to the following drawings, detailed description, and claims.

BRIEF DESCRIPTION OF THE DRAWINGS

FIG. 2 is a block diagram of a digital camera according to a preferred embodiment;

FIG. 3 is a schematic flow chart of a digital image distribution method according to one preferred embodiment;

FIG. 4 is a schematic flow chart of a digital image distribution method according to another preferred embodiment.

DETAILED DESCRIPTION

Reference will now be made in detail to the present preferred embodiments of the invention, examples of which are illustrated in the accompanying drawings.

Generally, systems and methods for distributing digital images are described herein. A user can share digital images stored on the memory card of the user's digital camera with another person by using the user's digital camera to convert the stored digital image data into lossless code, which can be displayed on a display screen of the user's camera, one or more printed sheets of paper, a computer screen, or the like. A person with whom the user desires to share the user's digital image can use his or her digital camera to capture the lossless code displayed on the user's display screen, printed sheet of paper, or computer screen. Then, this person can use his or her digital camera or a personal computer to convert the captured lossless code into a data file representing a copy of the original digital image shared by the original user. It will be understood that for purposes of this application, the terms "data file," "image data," and "image file" will include any data format representing a digital image, including, but not limited to, raw data, jpeg, gif, tiff, png, or the like.

Figure 1:
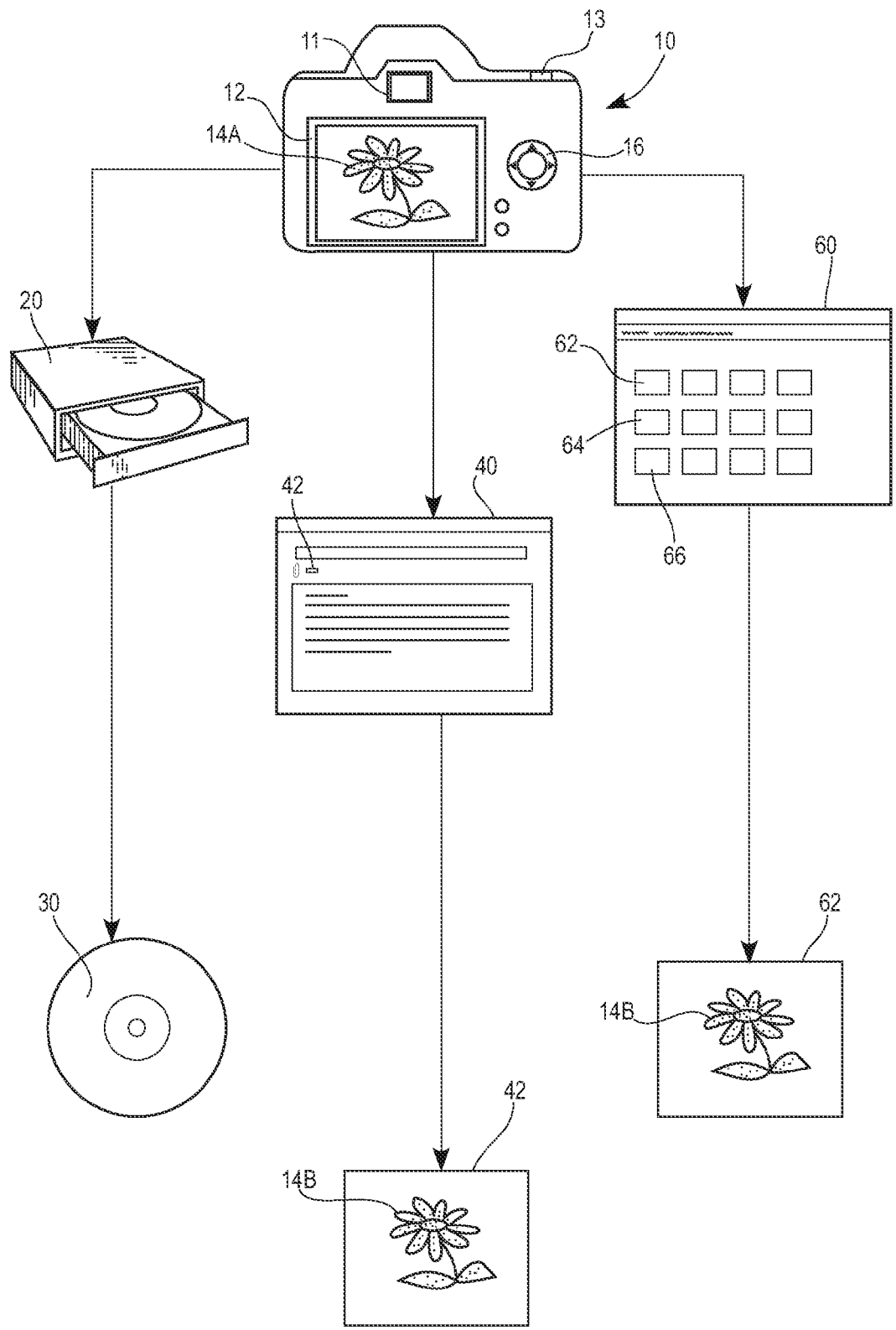
FIG. 1 is a schematic flow chart of previously known digital image distribution methods.

Referring to FIG. 1, a typical conventional digital camera 10 includes a viewfinder 11, a display screen 12, a snap button 13, and manual controls 16. A user can either use the viewfinder 11 or the display screen 12 to focus on a person or object of interest and capture an image using the snap button 13. Typically, a captured digital image 14A is displayed on the display screen 12 for the user to examine and is saved on a non-volatile storage media such as a memory card (not shown) of the digital camera 10. Digital camera 10, like most conventional digital cameras, can include hardware or software adapted to encode the image data representing digital images via lossy compression, where the image data is compressed by discarding some of the data. Lossy compression typically results in a reduction in file size and a reduction in the quality of the image.

FIG. 2 shows a block diagram of an embodiment of a digital camera 100 usable with the exemplary methods according to the present invention described hereinbelow. The digital camera 100 may be a conventional digital camera, a DSLR camera, or any other device that includes a digital camera (e.g., a mobile phone). The digital camera 100 may took exactly like the above-described conventional digital camera 10, and may include most of the hardware and software components of a conventional digital camera 10. The digital camera 100 includes a digital display screen 112, for example, an LCD display, which can be used as a viewfinder. The digital camera 100 further includes a processor 120; an internal memory 122 that permits temporary storage of image data during digital image capture and other functions; a memory card 124 that provides a larger and removable storage medium for digital images and/or digital videos; a power supply 126, which typically includes a battery such as a single use AA Nickel Metal Hydride (NiMH), or a rechargable battery such as a Lithium Ion battery; and an output 128 that allows the digital camera 100 to be connected to a personal computer, a television, or a media storage/display device.

The digital camera 100 includes a converter 130 adapted to convert the data files representing the digital images stored on the memory card 124 into lossless code and to convert the lossless code back into data files. The converter 130 may be hardware or software-based. For example, the converter 130 may be a logic chip having its own microprocessor, or a software program loaded onto the digital camera 100 and executable by the processor 120.

The converter 130 can convert the data file representing a digital image into lossless code (and lossless code back into the data file) without losing any digital data, permitting an identical copy of the digital image to be reconstructed from the lossless code, not an approximation of the digital image as would result from lossy compression. The digital camera 100 can include a dedicated button that allows a user to initiate the conversion from the data file into lossless code. Alternatively, the digital camera 100 may be programmed to include the option to initialize the data file to lossless code conversion via one or more menu screens displayed on the display 112.

FIG. 1 shows some of the most widely used methods of distribution of digital images. If a user wants to share the digital image 14A captured with the digital camera 10 with another person, the user typically can do one of the following. First, the user can transfer digital image data, typically a compressed JPEG, representing the digital image 14A onto a personal computer and use a CD/DVD drive 30 to burn the compressed digital image data onto a compact disc 30 such as a CD-ROM or a DVD-ROM. The digital disc 30 containing the digital image 14A can be subsequently given to an intended recipient of the digital image 14A. Alternatively, the user can attach an image file 42, usually, a compressed JPEG, representing the digital image 14A to an e-mail message 40, and send the e-mail message 40 via an e-mail server to the intended recipient, who can download the image file 42 and view the downloaded digital image 14B. In yet another alternative, the user can upload a digital image file 62, usually, a compressed JPEG, representing the digital image 14A (and other digital images 64, 66, etc.) captured by the digital camera 10 to a website 60, and one or more intended recipients can download the image file 62 and view the digital image 14B. Such methods are associated with at least the disadvantages described above.

FIG. 3 shows a method of distributing digital images according to one preferred embodiment. The method typically involves the use of either two identical digital cameras 100A and 100B, or the use of two different digital cameras having the converter 130 as described above. In a first step, a first user uses a first camera 100A to capture a first digital image 114A. The first digital image 114A is displayed on the first user's display screen 112A.

If the first user desires to share the first digital image 114A with one or more persons that have a digital camera 100B in their possession, in step 202, the first user can cause the digital camera 100A to convert the first digital image 114A into lossless code. This conversion can either be done by pressing a "CONVERT" button, if available, on the digital camera 100A, or by using the displayable menu options to select "CONVERT" to cause the converter 130 to convert the image data representing the first digital image 114A into lossless code. As such, the data file representing the digital image 114A is converted into lossless code 118A, which is displayed on the display screen 112A of the digital camera 100A. The lossless code 118A can be displayed on the display screen 112A as Quick Response (QR) Code or any other type of barcode usable as an optical machine-readable representation of data. The data representing the lossless code 118A displayed on the display screen 112A is temporarily stored in the volatile internal memory of the digital camera 100A, but optionally may be stormay more permanently on the non-volatile memory card of the digital camera 100A.

With the lossless code 118A being displayed on the display screen 112A of the first digital camera 100A, a second user, in step 204, can use his or her digital camera 100B to capture (i.e., optically capture, e.g., photograph) the lossless code 118A from the display screen 112A of the first digital camera 100A such that the captured lossless code 118B representative of the first digital image 114A is displayed on the display screen 112B of the second digital camera 100B. The data representing the lossless code 118B displayed on the display screen 112B is temporarily stored in the volatile internal memory of the digital camera 100B, but may be stored permanently on the non-volatile memory card of the digital camera 100B.

The second camera 100B, like the first camera 100A, includes the converter 130 adapted to convert lossless code back to RAW data. The converter may, for example, be similar in design to any of a number of converter apps used to convert QR codes optically captured by smartphones and tablets into digital data, such an Internet addresses or URLs. In step 206, the second user can cause the digital camera 100B to convert the lossless code 118B displayed on the display screen 112B into a data file representing a digital image 114B, which is an identical copy of the digital image 114A and can be displayed on the screen 112B of the digital camera 100B, as shown in FIG. 2. The data file representing the digital image 114B can be permanently saved on a memory card of the second digital camera 100B.

The method shown in FIG. 3 advantageously allows a user to distribute his or her digital images to other users spontaneously at the event where the digital images are taken and without needing personal computers, CD/DVD burners, Internet access, or e-mail access.

FIG. 4 shows a method of distributing digital images according to another preferred embodiment. This method, like the method of FIG. 3, involves the use of either two identical cameras 100A and 100B, or the use of two different cameras having the converter 130 as described above. In a first step, a first user uses the first camera 100A to capture a first digital image 114A. The first digital image 114A is displayed on the first user's display screen 112A.

If the first user desires to share the digital image 114A with one or more persons who do not have the camera 100B in their possession, but have one at home, in step 302, the first user can cause the digital camera 100 to convert the first digital image 114A into lossless code as described above in connection with FIG. 3. In step 302, the data file representing the digital image 114A is converted into lossless code 118A, but instead of being displayed on the display screen 112A of the digital camera 100A, the lossless code 118A is printed on a sheet of paper 80, as shown in FIG. 4.

The lossless code 118A can be depicted on the sheet of paper 80 as Quick Response (QR) Code or any other type of barcode usable as an optical machine-readable representation of data. To generate the sheet of paper 80 having the lossless code 118A, the first user would typically connect the digital camera 100A or the memory card of the digital camera 100A to a printer, either directly, or via a personal computing deice such as a desktop or laptop, and use the printer to print out the sheet of paper 80. The data representing the lossless code 118A can be stored temporarily on the volatile internal memory of the digital camera 100A or permanently on the non-volatile memory card of the digital camera 100A so that another sheet of paper 80 can be generated by the first user at a later time.

With the lossless code 118A being depicted on the sheet of paper 80, a second user, once he or she returns home, or otherwise gains access to his or her digital camera 100B, in step 304, can use his or her digital camera 100B to capture the lossless code 118A from the sheet of paper 80. The captured lossless code 118B representative of the first digital image 114A is displayed on the display screen 112B of the second camera 100B as shown in FIG. 4. The data representing the lossless code 118B displayed on the display screen 112B is temporarily stored in the volatile internal memory of the digital camera 100B, but optionally may be stored permanently on the non-volatile memory card of the digital camera 100B. It is to be appreciated that instead of capturing the lossless code 118A from the sheet of paper 80 using the digital camera 100B, the second user can scan the sheet of paper 80 using a scanner connected to the second user's personal computer device and later reproduce a digital image 114B that is an identical copy of the digital image 114A using a converter 130 built into, or installed on the personal computer.

The second camera 100B, like the first camera 100A, includes the converter 130, which is adapted to convert lossless code back into image data. In step 306, the second user can cause the digital camera 100B to convert the lossless code 118B displayed on the sheet of paper 80 into image data representing the digital image 114B, which is an identical copy of the digital image 114A, and can be displayed on the screen 112B of the digital camera 100B, as shown in FIG. 4. The data file representing the digital image 114B can be permanently saved on the memory card of the second camera 100B.

The method shown in FIG. 4 advantageously allows a user to distribute his or her digital images to others without needing personal computers, CD/DVD burners, Internet access, or E-mail access.

Figure 5:
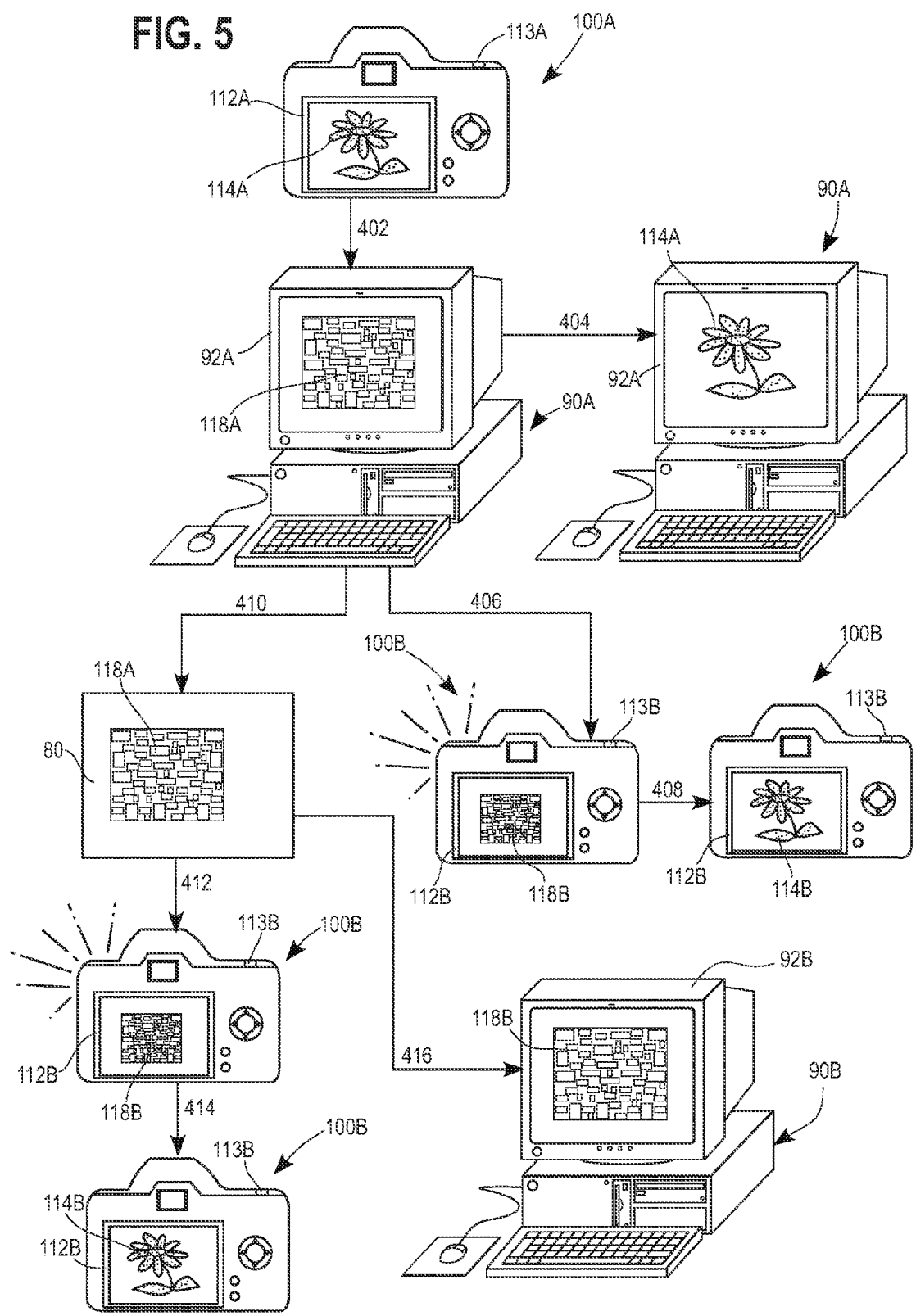
FIG. 5 is a schematic flow chart of a digital image distribution method according to another preferred embodiment.

FIG. 5 shows methods of distributing digital images according to additional preferred embodiments. Initially, a first user uses a first camera 100A, typically, by depressing the snap button 113A, to capture a first digital image 114A. The first digital image 114A is displayed on the display screen 112A of the digital camera 100A.

If the first user desires to share the digital image 114A with one or more people, in step 402, the user can use the digital camera 100 to convert the first digital image 114A into lossless code as described in connection with FIG. 3 above. In step 402, the data file representing the digital image 114A is converted into lossless code 118A, which is transferred via a memory card or a wired or wireless connection to the non-volatile memory (e.g., a hard drive) of a personal computer 90, and displayed on the display screen 92A of the personal computer 90A. It is to be appreciated that instead of transferring the lossless code 118A from the digital camera 100A to the personal computer 90A, the data file representing the digital image 114A can be transferred from the digital camera 100A to the personal computer 90A, which includes a converter such as the converter 130 and can convert the data file into the lossless code 118A. The lossless code 118A can be displayed on the display screen 92A of the personal computer 90A as Quick Response (QR) Code or any other type of barcode usable as an optical machine-readable representation of data.

In step 404, the lossless code 118A can be converted using the personal computer 90A into image data representing the digital image 114A, which is an identical copy of the digital image 114A displayed on the screen 112A of the digital camera 100A, and which can be displayed on the screen 92A of the computing device 90A as shown in FIG. 5.

With the lossless code 118A being displayed on the display screen 92A of the computing device 90A, a second user, in step 406, can use his or her digital camera 100B to capture the lossless code 118A from the display screen 92A of the computing device 90A such that the captured lossless code 118B representative of the first digital image 114A is displayed on the display screen 112B of the second digital camera 100B. The data representing the lossless code 118B displayed on the display screen 112B is temporarily stored in the volatile internal memory of the digital camera 100B, but optionally may be stored permanently on the non-volatile memory card of the digital camera 100B.

As discussed above, the second digital camera 100B, like the first digital camera 100A, includes the converter 130 adapted to convert the captures lossless code 118B back to image data. In step 408, the second user can cause the digital camera 100B to convert the lossless code 118B displayed on the display screen 112B into image data representing a digital image 114B, which is an identical copy of the digital image 114A, and which can be displayed on the screen 112B of the digital camera 100B, as shown in FIG. 5. The data file representing the digital image 114B can be permanently stored on the memory card of the second camera 100B.

If the first user desires to share the digital image 114A with one or more persons who do not have the digital camera 100B in their possession, but have one at home, in step 410, the first user can print the lossless code 118A displayed on the display screen 92A of the computing device 90A on a sheet of paper 80, as shown in FIG. 5. As discussed above in connection with FIG. 4, the lossless code 118A can be depicted on the sheet of paper 80 as Quick Response (QR) Code or any other type of barcode usable as an optical machine-readable representation of data.

With the lossless code 118A being depicted on the sheet of paper 80, a second user, once he or she returns home, or otherwise gains access to his or her digital camera 100B, in step 412, can use the snap button 113B of his or her digital camera 100B to capture the lossless code 118A from the sheet of paper 80. The captured lossless code 118B representative of the first digital image 114A is then displayed on the display screen 112B of the second digital camera 100B. The data representing the lossless code 118B displayed on the display screen 112B is temporarily stored in the volatile internal memory of the digital camera 100B, but optionally may be stored permanently on the non-volatile memory card of the digital camera 100B.

Instead of capturing the lossless code 118A from the sheet of paper 80 using the digital camera 100B as in step 412 of FIG. 5, the second user, in step 416, can capture the lossless code 118A from the sheet of paper 80 by using a scanner connected to the second user's computing device 90B to cause the captured lossless code 118B to appear on the display screen 92B of the computing device 90B. Substantially as described in reference to step 404 above, the second user can then use the computing device 90B, which includes a converter 130 like the computing device 90A, to convert the captured lossless code 118B into a data file representing a digital image 114B, which is an identical copy of the digital age 114A and can be displayed on the screen 92B of the computing device 90B. The data file representing the digital image 114B can be permanently saved in the non-volatile memory (e.g., a hard drive) of the computing device 90B.

The methods shown in FIG. 5 advantageously allow a user to distribute his or her digital images to other users without needing CD/DVD burners or Internet access.

It is to be appreciated that the data representing the lossless code 118A displayed on the first user's display screen 112A, or on the sheet of paper 80 may be sufficient to represent the entire data file representing the digital image 114A, such that the second user would only need to use his or her digital camera 100B to capture one lossless code 118A displayed on the first user's display screen 112A. However, size limitations associated with QR Code may result situations where several images of the lossless code 118A may be needed to reproduce the data file representing the digital image 114A.

For example, the data file representing the digital image 114A can be 5 Megabytes (MB), while the data representing the lossless code 118A on the first user's screen and corresponding to the digital image 114A can be limited to 1 MB. In such a case, the lossless code 118A would represent only one-fifth of the total data file representing the digital image 114A. Accordingly, the conversion step from the RAW data file to lossless code would include generating four lossless code images additional to the lossless code 118A, and sequentially displaying the five generated 1 MB lossless code images either on the display screen 112A, or on five sheets of paper 80 for the second user to sequentially capture using his or her camera 100B. When the second user captures five 1 MB lossless code images 118B with his camera, the second user can use the camera 100B to sequentially or simultaneously convert the five 1 MB lossless codes 118B into the 5 MB data file representing the digital image 114B, which is an identical copy of the digital image 114A.

It is to be appreciated that while the digital cameras 100A and 100B have been shown in the above Figures as compact digicams, the digital cameras 100A and 100B can be any other suitable device that incorporates a digital camera, for example a smart phone, tablet computer, or the like. It is to be appreciated that while the computing device 90A has been shown as a desktop computer, the computing device can be any other suitable computing device such as a laptop, a PDA, a smart phone, or the like.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. A method of distributing digital images, the method comprising:
    providing first and second digital cameras each including a display and adapted to capture digital images;
    capturing a first digital image by snapping a person or object of interest using the first digital camera;
    converting, using the first digital camera, the first digital image into lossless code representing the first digital image captured by the first digital camera;
    displaying the lossless code representing the first digital image captured by the first digital camera on the display of the first digital camera;
    capturing, using a second digital camera, the lossless code representing the first digital image captured by the first digital camera and displayed on the display of the first digital camera, by snapping the display of the first digital camera using the second digital camera;
    converting, using the second digital camera, the lossless code representing the first digital image captured by the first digital camera and captured from the display of the first digital camera into a copy of the first digital image; and
    displaying, on the display of the second digital camera, the copy of the first digital image converted from the lossless code representing the first digital image captured by the first digital camera.

2. The method of claim 1, wherein the converting the first digital image into lossless code includes converting a data file representing the first digital image into at least one lossless code image, and storing data representing the at least one lossless code image in at least one of a volatile memory and a non-volatile memory of the first digital camera.

3. The method of claim 1, wherein the displaying the lossless code on the display of the first digital camera includes displaying a plurality of lossless code images on the display of the first digital camera, each of the plurality of lossless code images being representative of a respective part of a data file comprising the first digital image.

4. The method of claim 3, wherein the capturing the lossless code displayed on the display of the first digital camera includes capturing, using the second camera, each of the plurality of the lossless code images representative of the respective part of the data file comprising the first digital image.

5. The method of claim 1, wherein the capturing the lossless code displayed on the display of the first digital camera includes storing data representing the lossless code captured by the second digital camera in at least one of volatile and non-volatile memory of the second digital camera.

6. The method of claim 1, wherein the converting the lossless code captured from the display of the first digital camera into a copy of the first digital image includes converting data representing at least one lossless code image corresponding to the first digital image into a data file comprising a copy of the first digital image.

7. A method of distributing digital images, the method comprising:
    providing first and second digital cameras each including a display and adapted to capture digital images;
    capturing a first digital image by snapping a person or object of interest using the first digital camera;
    converting, using the first digital camera, the first digital image into lossless code representing the first digital image captured by the first digital camera;
    printing the lossless code representing the first digital image captured by the first digital camera on at least one sheet of paper;
    capturing the lossless code representing the first digital image captured by the first digital camera on the at least one sheet of paper using a second digital camera by snapping the at least one sheet of paper using the second digital camera;
    converting, using the second digital camera, the lossless code representing the first digital image captured by the first digital camera and captured from the at least one sheet of paper into a copy of the first digital image; and
    displaying, on the display of the second digital camera, the copy of the first digital image converted from the lossless code representing the first digital image captured by the first digital camera printed on the at least one sheet of paper.

8. The method of claim 7, wherein the converting the first digital image into lossless code includes converting a data file representing the first digital image into at least one lossless code image and storing data representing the at least one lossless code image in at least one of a volatile memory and a non-volatile memory of the first digital camera.

9. The method of claim 7, wherein the printing the lossless code on at least one sheet of paper includes printing a plurality of lossless code images on the at least one sheet of paper, each of the plurality of lossless code images being representative of a respective part of a data file comprising the first digital image.

10. The method of claim 9, wherein the capturing the lossless code on the at least one sheet of paper includes capturing, using the second camera, each of the plurality of the lossless code images representative of the respective part of the data file comprising the first digital image.

11. The method of claim 7, wherein the capturing the lossless code displayed on the display of the first digital camera includes storing data representing the lossless code in at least one of volatile and non-volatile memory of the second digital camera.

12. The method of claim 7, wherein the converting the lossless code on the at least one paper into the copy of the first digital image includes converting the data representing the lossless code representative of the first digital image into a data file comprising the copy of the first digital image.

13. A method of distributing digital images, the method comprising:
- providing a first digital camera including a display and adapted to capture digital images;
- capturing a first digital image by snapping a person or object of interest using the first digital camera;
- converting, using the first digital camera, the first digital image into lossless code representing the first digital image captured by the first digital camera;
- storing the lossless code representing the first digital image captured by the first digital camera on a digital storage medium;
- converting the lossless code representing the first digital image captured by the first digital camera and stored on the digital storage medium into a copy of the first digital image using a computing device including a processor and a display; and
- displaying, on the display of a computing device, the copy of the first digital image converted from the lossless code representing the first digital image captured by the first digital camera stored on the digital storage medium.

14. The method of claim 13, wherein the storing the lossless code on the digital storage medium further comprises storing the lossless code on one of a portable memory drive and a hard drive of the computing device.

15. The method of claim 13, wherein the converting the lossless code stored on the digital storage medium into a copy of the first digital image includes displaying the lossless code stored on the digital storage medium on the display of the computing device.

16. The method of claim 15, wherein the displaying the lossless code on the display of the computing device further comprises capturing the lossless code displayed on the display of the computing device using a second digital camera.

17. The method of claim 16, further comprising converting, using the second digital camera, the lossless code captured from the display of the computing device to the copy of the first digital image.

18. The method of claim 15, further comprising printing, on at least one sheet of paper, the lossless code displayed on the display of the computing device.

19. The method of claim 18, further comprising capturing the lossless code displayed on the at least one sheet of paper using one of a second digital camera and a second computing device.

20. The method of claim 19, further comprising converting, using a respective one of the second digital camera and the second computing device, the lossless code captured from the sheet of paper into the copy of the first digital image.

21. The method of claim 1, wherein the first digital image is a RAW data file of a digital photograph,
- wherein the converting, using the first digital camera, the first digital image into lossless code representing the first digital image captured by the first digital camera further comprises converting the RAW data file into the lossless code representing the RAW data file, and
- wherein the converting, using the second digital camera, the lossless code representing the first digital image captured by the first digital camera and captured from the display of the first digital camera into a copy of the first digital image further comprises converting the lossless code into a copy of the RAW data file.

22. The method of claim 7, wherein the first digital image is a RAW data file of a digital photograph,
- wherein the converting, using the first digital camera, the first digital image into lossless code representing the first digital image captured by the first digital camera further comprises converting the RAW data file into the lossless code representing the RAW data file, and
- wherein the converting, using the second digital camera, the lossless code representing the first digital image captured by the first digital camera and captured from the at least one sheet of paper into a copy of the first digital image further comprises converting the lossless code into a copy of the RAW data file.

23. The method of claim 13, wherein the first digital image is a RAW data file of a digital photograph,
- wherein the converting, using the first digital camera, the first digital image into lossless code representing the first digital image captured by the first digital camera further comprises converting the RAW data file into the lossless code representing the RAW data file, and
- wherein the converting the lossless code representing the first digital image captured by the first digital camera and stored on the digital storage medium into a copy of the first digital image using a computing device including a processor and a display further comprises converting the lossless code into a copy of the RAW data file.

* * * * *